Sheet 1—2 Sheets.

C. Wheeler Jr
Harvester Rake.

Nº 77146

Patented Apr. 21, 1868

Fig. 3.ᵃ

Witnesses
N B Smith
Alex Mahan

Inventor.
Cyrenus Wheeler Jr
by his Attorney
Addison M Smith

C. Wheeler Jr.
Harvester Rake.

N° 77,146.   Patented Apr. 21, 1868.

Witnesses.

Inventor.

UNITED STATES PATENT OFFICE.

CYRENUS WHEELER, JR., OF AUBURN, NEW YORK.

IMPROVEMENT IN HARVESTER-RAKES.

Specification forming part of Letters Patent No. 77,146, dated April 21, 1868.

DIVISION B.

*To all whom it may concern:*

Be it known that I, CYRENUS WHEELER, Jr., of Auburn, in the county of Cayuga and State of New York, have invented certain new and useful Improvements in Harvesting-Machines, of which the following is a full, clear, and exact description, reference being had to the accompanying drawings, in which—

Figure 2:
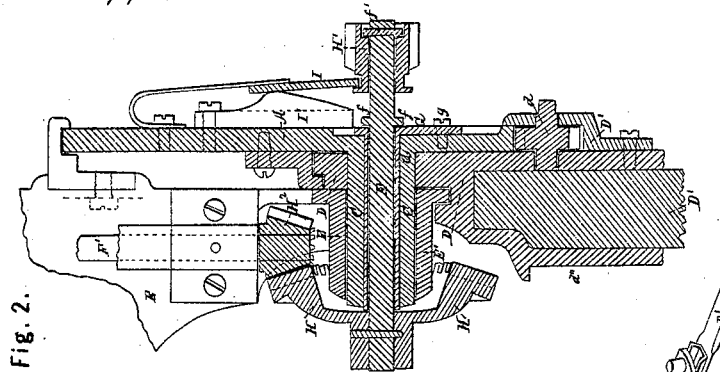
Figure 1:
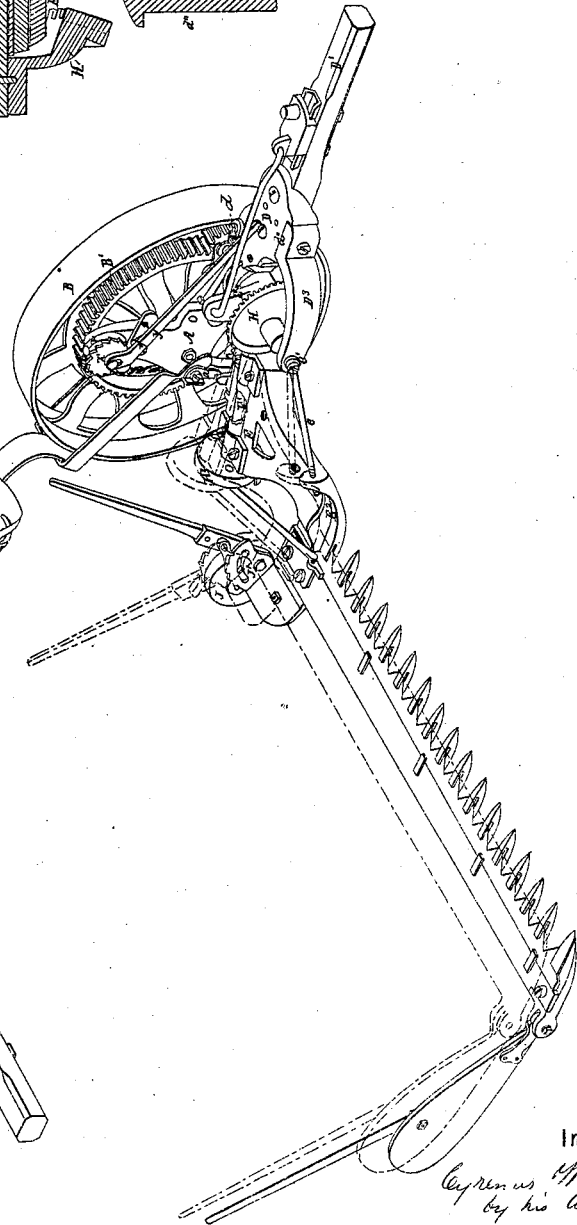
Figure 3:
Figure 3:
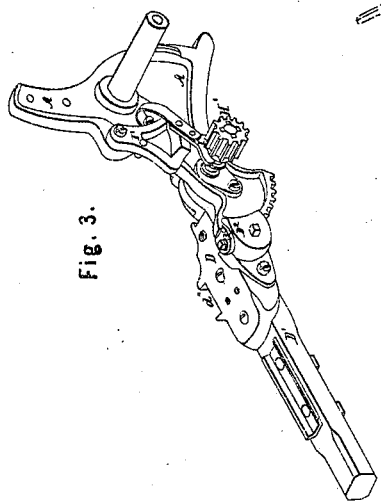
Figure 6:
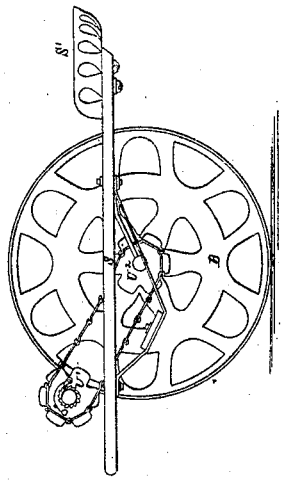
Figure 5:
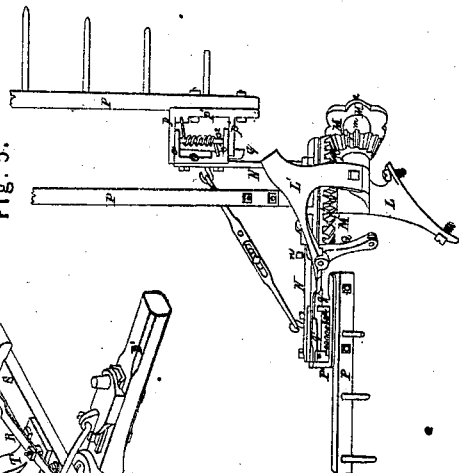
Figure 4:
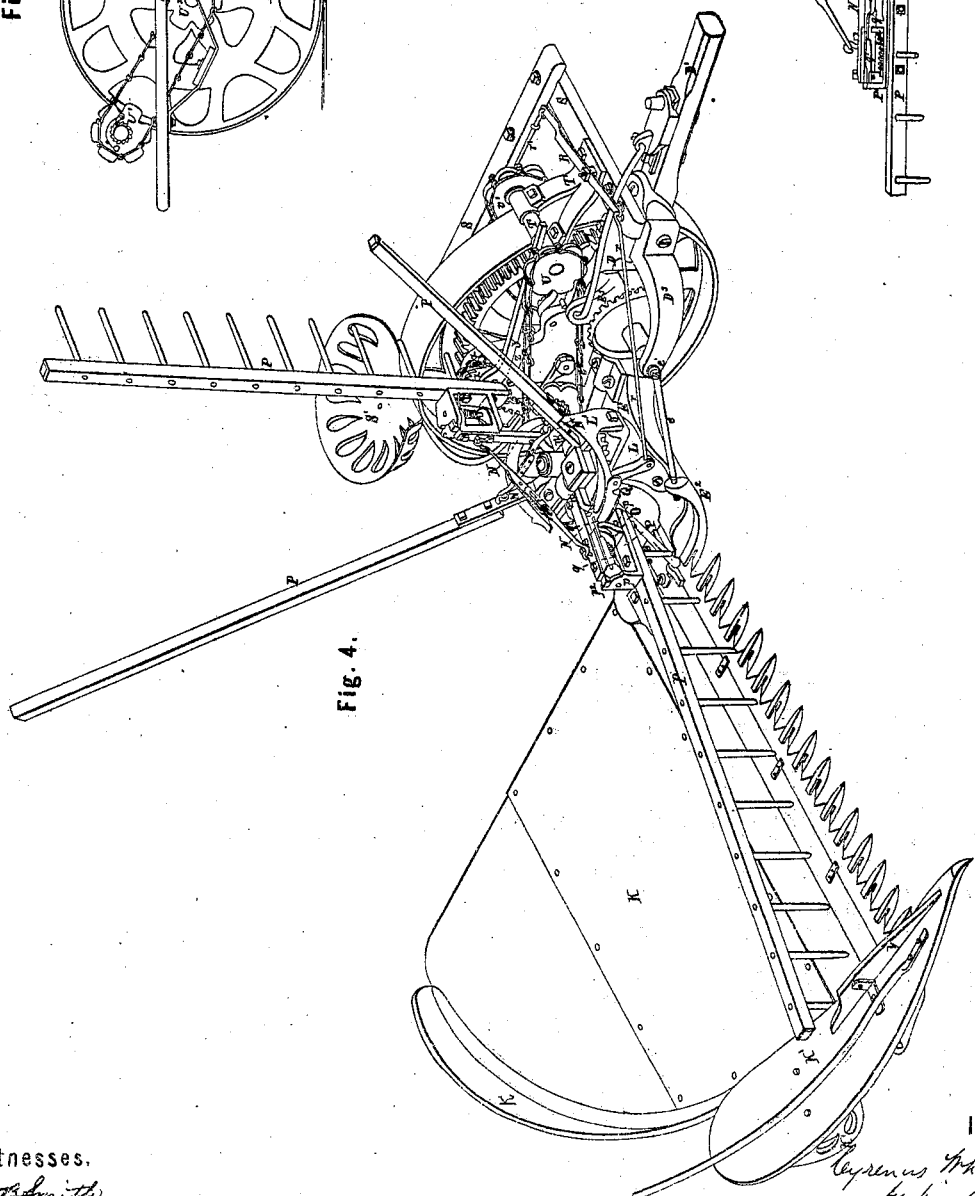

Figure 1 is a perspective view of a harvesting-machine embracing my improvements, adapting the machine to be used as a mower. Fig. 2 is a horizontal section of the same, taken in the line of the bevel-wheel shaft, and showing the relative arrangement of the main or drive-wheel frame and the crank and draft frames. Fig. 3 is a perspective view of the tongue and main frames, taken from the front stubble side or corner of the machine. Fig. 4 is a perspective view of the machine with the grain-platform, automatic rake and reel, and other fixtures applied, adapting the machine to reaping. Fig. 5 is a perspective view of the automatic raking and reeling apparatus detached from the machine; and Fig. 6 is a grain-side elevation of the drive-wheel, showing the arrangement of the rake-driving sprocket-wheels and the manner of supporting the driver's seat when the machine is used as a reaper.

Similar letters denote corresponding parts in the several figures.

The invention relates to that class of harvesters known and distinguished as "combined" machines—that is, machines constructed for the purpose of reaping grain and mowing grass—processes requiring different arrangements and combinations of parts, some of which are common to and indispensable in both processes, and others of which are only necessary in and applicable to one of such processes.

Although a division of the invention into two parts, embraced under separate applications, will be made, a full description of all the parts in each application is deemed necessary, in order to give a clear understanding of the invention. The claims in this application, however, will be confined mainly to the characteristic features of the machine as a reaper, the other application embracing the claims to the novel features of the machine as a mower.

In the accompanying drawing, A represents the main frame of the machine, constructed in one piece, having an axle on one side for receiving the driving-wheel B, and on the other side it has a hollow cylindrical arm or projection, C, which serves to support the gearing, and as a point of attachment for the tongue-frame D and crank or cutter frame E.

The bevel-wheel shaft F is supported by a pipe-box, G, inserted in the chamber of the cylindrical part of the main frame, and retained in position therein by a single bolt, $g$, passing through a flange in the box and through the main frame. The shaft F is formed with a collar, $f$, which, with the bevel-wheel H on the other end of the shaft, serves to prevent end play in the pipe-box. The pinion $H^1$ is placed loosely on the end of shaft F, outside of the collar, and is recessed on its outer face for locking with the pin $f'$ in the end of the shaft. It has also a groove formed in the periphery of its hub, in which a fork, I, connected by a spring to the main frame, is inserted, so that the recoil of the spring will keep the pinion against the collar $f$ at all times when not forced outward by the pivoted vibrating wedge I', through which the pinion is made to lock with the pin $f'$ in the shaft, at the pleasure of the operator. The pinion gears with the teeth of the gear-rim B' on the drive-wheel, and receives its motion therefrom.

The tongue-frame D has a recess on its under side to receive the tongue $D^1$, and an eye or sleeve at its rear end, embracing and uniting it to the cylindrical arm or projection of the main frame, forming a hinge-connection therewith. On the side of the tongue-frame is mounted a gear-pinion, $d$, secured in proper bearings, and having an axle projecting from its casing $D^2$, for receiving a lever or wrench for turning it. This pinion meshes with a sector-gear on the front end of the main frame, so that any motion given to the pinion imparts a corresponding motion to the main and tongue frames, the axial centers of movement of said frames being coincident with the center of the bevel-wheel shaft F. A dog or button, $d'$, is provided for locking the two frames in any desired relation to each other.

The crank-frame E is constructed with a sleeve, $E^1$, for uniting it to the main frame A, and with a shoe, $E^2$, for supporting the finger-bar and cutting apparatus. On this frame E is mounted the crank-shaft F', supported in suitable bearings, and having a bevel-pinion, $H^2$, on one end, and a crank-head, $H^3$, on the other. This crank-frame is united to the cylindrical part of the main frame by its sleeve, $E^1$, in such a manner as to form a hinge therewith, the center of which coincides with the center of the bevel-wheel shaft F, the shaft F' being so located on the frame E that the bevel-pinion $H^2$ will mesh with the bevel-wheel H.

The frame E, when unrestrained, is free to vibrate independently of the main frame, tongue-frame, or drive-wheel, so that the cutting apparatus and frame E, while they move forward with the other frames, have a vibrating movement independent of them, and can follow the profile of the ground in mowing, independently of the movement of such other frames.

In order that the cutting apparatus and crank-frame may not have to be drawn as so much dead-weight over the ground in mowing, a standard, $E^3$, is formed on the sleeve of the crank-frame, provided with a series of holes at different heights. To this standard the whiffletrees, which are connected to the tongue by a recessed sliding head, are united by a link or rod, in such manner that the draft of the team, in propelling the machine, is applied directly to the crank-frame and cutting apparatus, the tongue only serving to steady and guide the machine, and to preserve the angle of presentation of the cutters through the adjustment of the main and tongue frames.

The draft being thus applied above the center of the axis on which the crank-frame vibrates, a great part of the weight of the crank-frame and cutting apparatus is thrown on the main frame, and, through the main frame, upon the drive-wheel, thereby increasing its driving capacity, and at the same time diminishing the friction upon the ground.

The cutting apparatus is of the ordinary construction, and is supported at one end only by the shoe $E^2$, to which it is bolted, projecting laterally therefrom. The cutters are connected to the crank head or wheel $H^3$ by a pitman, and receive a reciprocating motion from driving-wheel through the gearing described. A brace, $e$, connected at one end to a flange or lug on the shoe, is pivoted at its other end, at a point marked $e'$, in line with the center of the bevel-wheel shaft, to an arm, $D^3$, which is rigidly connected with the tongue-frame at $d''$.

To raise the cutting apparatus for passing an obstruction, &c., when the machine is adapted to mowing, a wheel, J, on a bell-crank axle, with a lever and a reversible dog, is fastened by a stud to the shoe $E^2$, or to an upright, J', on the heel-extension thereof, and a stop, $a$, is pivoted to the main frame A, to limit the upward movement of the crank-frame. By means of the lever connected with the wheel J, as described, said wheel can be made to act as a fulcrum on which to raise the main frame and inner end of the cutting apparatus until the frame E meets the stop $a$, when a continued movement of the lever raises the outer end of the cutting apparatus also, thus raising the cutting apparatus in its entire length. When not in use for raising the cutting apparatus, the wheel may, if desired, be raised clear of the ground, and sustained in such position by means of the reversible dog or pawl and the double or reversed ratchets on upright J', as represented in Fig. 1.

The driver's seat $b$ in mowing is placed behind the drive-wheel, within reach of the lever last described, and is supported on the main frame by bars or legs extending forward, one on each side of the driving-wheel, that on the inner side being united to the frame near the center of the axle, and that on the outer side to a washer or sleeve, $b'$, on the axle. (See Fig. $3^a$.)

When the machine is to be used for reaping, the driver's seat, and the lifting-wheel and lever, and stop $a$, above described, are removed, together with the track-clearer at the outer end of the cutting apparatus, and, in lieu of the parts removed, a seat-frame, S, hereinafter described, and a quadrant-shaped platform, K, provided with an outer curved rim or guard, $k$, a separator or dividing-board, $k'$, and an adjustable grain-wheel, $K^1$, are substituted.

An automatic raking and reeling apparatus of the class known as a "combined" rake and reel, the arms of which move about a vertical or nearly vertical axis, (represented in Fig. 4, and also in the detached view, Fig. 5,) is attached to the drooping crank or cutter frame at a point in advance of the cutters, and behind the main drive-wheel axle, and outside of a line drawn parallel with the path of the machine, and touching the outer or grain side of the main shoe $E^2$.

The rake-standard L has an inclined foot or base, adapting it to the inclined or drooping frame, to which it is attached, so as to give to the rake-wheel shaft, or pivot formed thereon, a slightly-inclined position, or a position perpendicular, or nearly so, to the inclined platform K, and is provided with a horizontal stud or shaft, on which are mounted a bevel-pinion and sprocket-wheel, $M^1$ $M^2$, connected by a sleeve, $m$, the bevel-wheel $M^1$ gearing with and driving the crown or bevel-rake wheel M, in the manner represented in the drawing.

Standard L has also formed upon it suitable flanges or arms for supporting the inclined camway or track L'.

The crown or rake wheel M is recessed or armed with a flanged cap, in which any desired number of rake and reel arms N are pivoted in lines radial to the rake shaft or pivot. Said arms are provided with set-screws $n$, for adjusting the angle of relation of the arms to the revolving head or wheel M.

O is an angle-iron attached to the outer end of arms N, which affords a support, through arms $o^1$ $o^1$, for a pivot or shaft, $o^2$, upon which the rake-head P is mounted or suspended by means of a similar angle-iron, P', attached to the rake-head, and turning on the pivot $o^2$.

Shaft or pivot $o^2$ has a spiral spring surrounding it, one end of which is connected with angle-iron O and the other with the angle-iron P', in such manner that the tension of the spring shall always act upon the rake-head to turn it up, causing the rake-teeth to assume a horizontal position, when not restrained by the action of a locking-latch, $q$, held in lock by a spring, $q'$. Said latch is pivoted in the outer arm $o^1$ of angle-iron O, and works in a guiding notch or slot in arm $o^1$, the inner end extending over a pivoted extension of the cam-track, and being operated for releasing the latch, as hereinafter described.

When the rake-teeth are in position for discharging the platform, the rake-head is prevented from turning by the latch engaging with a shoulder on the inner arm of angle-iron P'. The throw of the rake, in turning on longitudinal pivot $o^2$, is regulated by stops or shoulders on the outer arm of angle-iron P', arranged at about right angles to each other, striking against a lug, $p^2$, on angle-iron O or arm N.

The lower or platform side of the inclined cam-track is open, and the rake and reel arms are united in pairs by means of an adjustable link, so that the arm, sweeping over the platform, is held in proper working relation thereto by the action of the cam upon the opposite vertical, or nearly vertical, arm of the pair.

Q is a bell-crank lever, pivoted to the forward descending arm of the cam-track, the horizontal arm of which forms an expansion of said track, the other arm of the lever being connected by a link, $r$, to one end of a lever, R, mounted on the seat-frame S, the opposite end of which lever has connected to it a sliding rod or arm, $r'$, extending to within convenient reach of the driver on seat S'.

The arrangement of the lever Q is such that when the horizontal arm is thrown up against the cam-track by the driver by means of the levers and connections described, said arm acts upon the spring rake-latch described and releases the rake-head, allowing the teeth to be turned from a vertical to a horizontal position, and thereby to pass over the grain on the platform without discharging the same, the change in the position of the rake-teeth being effected just as they reach the forward edge of the platform, and after they have gathered up the uncut grain in front of and presented it to the action of the cutters.

The rake-head is automatically retracted, to cause the rake-teeth to resume their vertical position, by the action of the rear expanded arm of the cam upon the inner or heel end of the rake-arm.

The rake and reel arms are extended in length in such manner as to cause the outer ends, in reeling in the grain, to reach the point of the divider, and the shaft or center of motion of said arms being in advance of the cutters, and in line, or about in line, with the point of the divider, the movement of the outer end from said point is inward, so as to prevent its interference with the uncut grain, and to effect a more thorough separation of the cut grain therefrom.

The inclined position of the rake-shaft causes the rake-teeth to descend below the plane of the cutters, in advance thereof, and to rise as the rake-head approaches a position parallel with the cutting apparatus, and thereby to pick up the fallen and tangled grain, properly present the same to the action of the cutters, and then turning, as described, to deposit it upon the platform, or, retaining their vertical position, at the option of the driver, to discharge the grain therefrom behind the machine.

An inclined track or wedge, $v$, secured to the divider, acts upon the overhanging ends of the rake-arms, and serves effectually to prevent the rake-teeth, when loaded with the fallen and tangled grain, as described, from being carried into and caught by the cutters.

The seat-frame S, carrying seat S', in reaping, is connected at its forward end to the tongue-frame D, and at its rear end is supported by two curved standards—one fastened to the main frame and inside of the drive-wheel, in or about in line with the axle, the other directly to the axle, outside the drive wheel.

T is a horizontal shaft, located in front of the drive-wheel, in bearings in a standard, T', on seat-frame S. This shaft has two sprocket-wheels, U $U^1$, mounted upon it, one at each end, the latter, $U^1$, being connected with the shaft by means of a backing-ratchet, (shown in Fig. 6,) for allowing a backward movement of the machine without operating the rake and reel.

Sprocket-wheel U and its shaft T are operated, in the forward movement of the machine, by a chain from sprocket-wheel $U^2$, attached to and turning with the drive-wheel; and, by means of a similar chain passing from sprocket-wheel U to sprocket-wheels $M^2$, motion is communicated, through bevel-wheels M $M^1$, to the revolving rake and reel.

Instead of the vertical sprocket-wheels U $U^1$ on horizontal shaft T, two loose horizontal pulleys may be arranged upon a common vertical pivot, the pulleys being made of sufficient diameter to pass the chain, which, in this case, would be continuous, around the drive-wheel from the sprocket-wheel $U^2$ to sprocket-wheel $M^2$.

$x$ is a pulley mounted on a pivot on the main frame, to which one end of a lifting cord or chain is attached, the other end of said cord or chain being attached to the crank-frame E.

$x'$ is a ratchet-wheel, attached to and turning with pulley $x$, and $y$ is a slotted lever, provided with a fixed pawl, $y'$, by means of which the driver is enabled to rotate the pulley and raise the frame E and inner end of the cutting apparatus, which are held at any desired degree of elevation by means of a weighted dog, $z$, engaging with and holding the ratchet-wheel and pulley. The height of the outer end of the cutting apparatus is regulated by the adjustment of the grain or carrying wheel K', above described.

What is claimed in this application is—

1. In a combined reel and rake, the arms of which are hinged, independently of each other to and travel around an axis perpendicular, or nearly so, to the platform, arranging said axis on the vibrating crank-frame in front of a line drawn along the front edge of the finger-bar.

2. Mounting the axis of a combined reel and rake on a vibrating crank-frame which can rise and fall independently of the main or gear frame.

3. The location of the axis of a combined reel and rake upon a vibrating crank-frame, behind the axis of the main wheel, in front of the finger-bar, and outside of a line drawn across it at right angles, and touching the outside of the shoe.

4. In a combined reel and rake the arms of which are hinged to and move around an axis perpendicular, or nearly so, to the platform, hinging the rake-heads to the arms, and so combining them with mechanism under the control of the driver, that the teeth of the rake shall, in reeling, retain a vertical position until they reach the finger-beam, and then roll back to pass over the platform, and in raking retain a vertical position in their passage over the platform for the discharge of the gavels.

5. Driving a combined reel and rake, located on one side of and below the highest point of the drive-wheel, by mechanism connecting it with the hub of the wheel on the other side, substantially as described.

6. Adjusting and supporting the crank-frame and inner end of the cutting apparatus, in reaping, by a chain connected with a lifting wheel and lever mounted on the main frame, substantially as described.

7. Changing the angle of cut and the inclination of the platform by means of a pinion in the draft-frame, combined with a sector-gear on the main frame.

8. The ridge-board or inclined track on the grain-divider, in combination with the overhanging ends of the rake-heads.

9. The employment of set-screws, in combination with the rake and reel arms and the revolving head, to which the arms are pivoted, for adjusting the height or angle of the rakes.

10. A combined rake and reel the arms or rake-heads of which rotate about a shaft or pivot in advance of the finger-bar, and are of sufficient length to reach the point of the divider in reeling in the grain, in combination with an inclined track or ridge-board for raising rake-heads to pass the cutters.

11. Automatically retracting the rake-head to cause the rake-teeth to resume their vertical position by means of the lower heel end of the camway acting upon the inner or heel end of the rake-head, substantially as described.

C. WHEELER, JR.

Witnesses:
  N. B. SMITH,
  EDM. F. BROWN.